Figure 1:
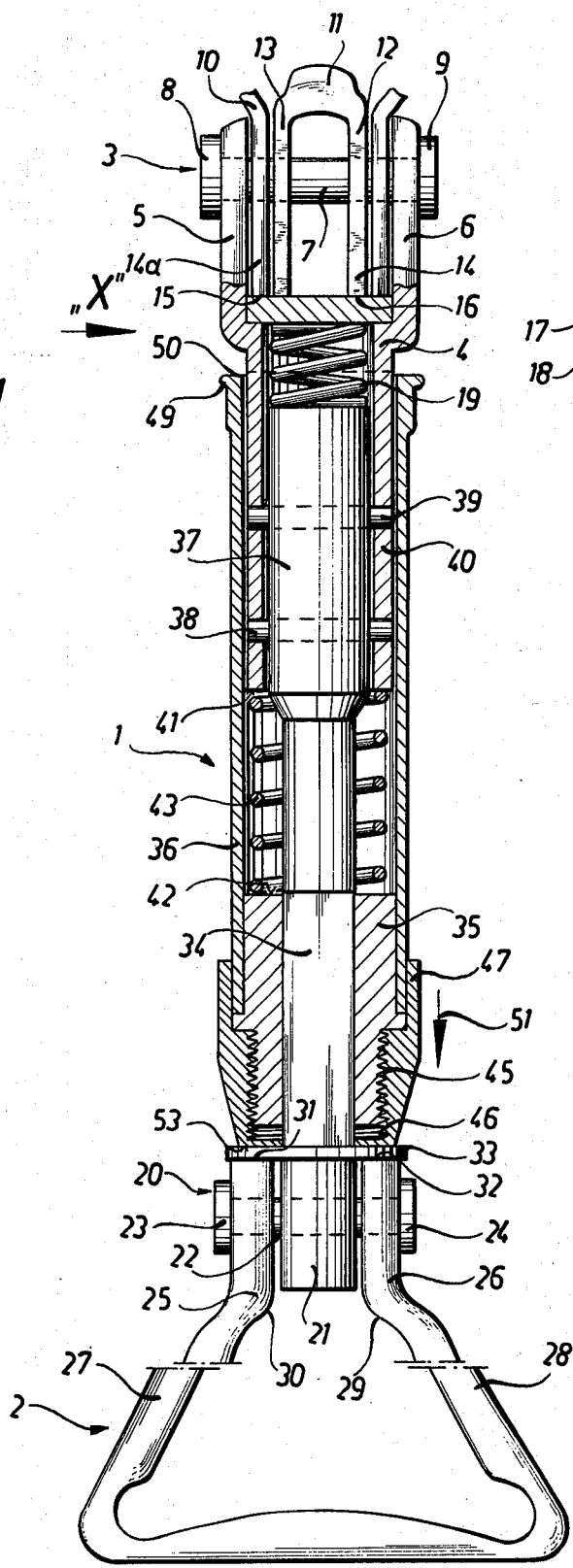

United States Patent [19]
Rusing et al.

[11] 3,993,340
[45] Nov. 23, 1976

[54] CHOPPING SPADES

[75] Inventors: Willi Rusing; Rudolf Adamovsky, both of Herdecke, Germany

[73] Assignee: Idealspaten-und Schaufelwalzwerke A. Bredt & Co. KG, Herdecke, Germany

[22] Filed: Jan. 9, 1976

[21] Appl. No.: 647,716

[30] Foreign Application Priority Data
June 18, 1975 Germany............................ 2527146

[52] U.S. Cl............................ 294/53.5; 172/374; 7/1 L; 7/14.55; 294/57; 294/51
[51] Int. Cl.²........................................... A01A 1/22
[58] Field of Search ............... 294/53.5, 54, 57, 59, 294/49, 51, 123; 56/400.18, 400.19, 400.20; 172/372, 373, 374, 375; 7/1 L, 14.55, 16; 403/373, 376

[56] References Cited
UNITED STATES PATENTS

| | | | |
|---|---|---|---|
| 691,309 | 1/1902 | Goldsmith............................ | 294/57 |
| 993,015 | 5/1911 | Bengtsson............................ | 294/51 |
| 1,221,650 | 4/1917 | Atkins et al. ........................ | 172/374 |
| 3,115,359 | 12/1963 | Hendrik............................. | 294/53.5 |

Primary Examiner—James B. Marbert
Attorney, Agent, or Firm—Malcolm W. Fraser

[57] ABSTRACT

A collapsible chopping spade comprises a shaft with a tool joint at one end and a handle joint at the other end so that both the tool and the handle can be folded against the shaft. A unitary locking arrangement is provided for securing the handle in either its operative or its folded away position and for securing the tool in either of two operative positions or in its folded away position, the arrangement being such that the handle joint cannot be locked with simultaneously locking the tool joint.

12 Claims, 4 Drawing Figures

U.S. Patent  Nov. 23, 1976  Sheet 1 of 3  3,993,340

"X"

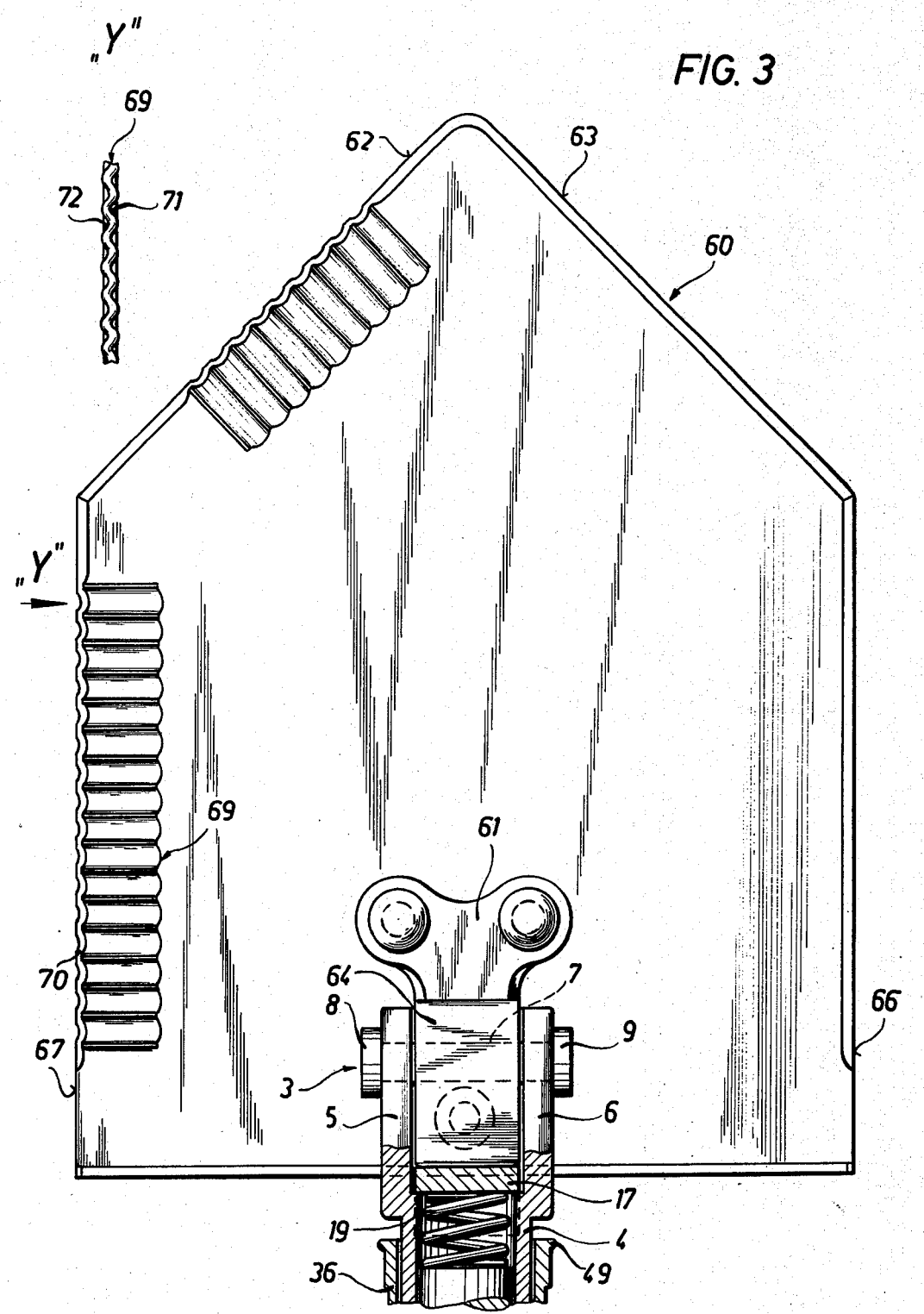

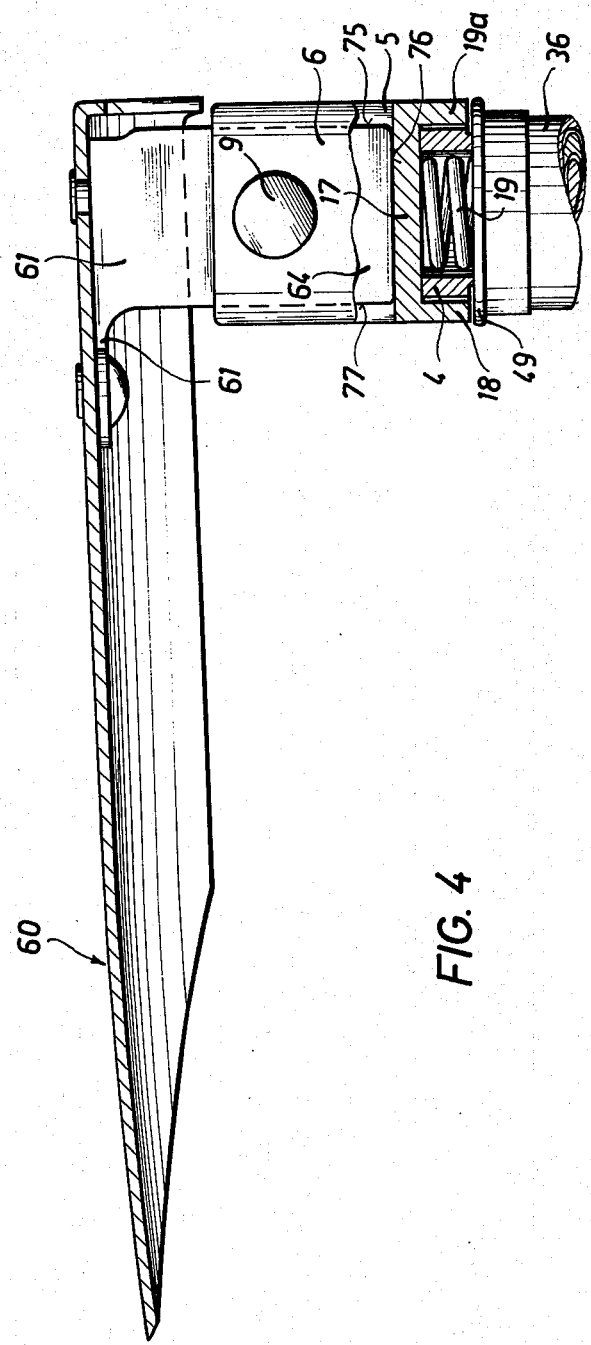

CHOPPING SPADES

This invention relates to a collapsible chopping spade having a shaft with a handle and a tool joint for at least one tool. The tool joint has support edges associated with the various positions of the tool and a movable abutment is provided for locking and unlocking the tool joint.

Collapsible chopping spades are used for civilian purposes, for example as car accessories. They can serve to free a bogged down or ice-bound car, the spade being used as a shovel and the chopper, for example, as an ice-pick. In the military field collapsible chopping spades are mainly used by the infantry for entrenching. The chopper facilitates penetration into firm ground and consequently makes it possible to dig quickly even under difficult conditions. In addition, the collapsible chopping spade is used in the military field as a convenient striking weapon.

In all cases, it is possible to unfold the tool of the collapsible chopping spade and secure it in its correct working position. For facilitating work with the chopper it should be possible to half unfold the spade blade and to lock it in this position.

A collapsible chopping spade for this purpose with a chopping tool separate from the spade and with the characteristics mentioned at the beginning, is already known. A bearing of the tool joint common to both tools is formed at the end of a socket, which is attached to one end of a wooden shaft. A handle, for example in the form of a round knob, is mounted on the other end of the wooden shaft. The pivot pin of the joint has a square section and the tool joint parts assigned to the spade blade or the chopping tool are provided with corresponding square recesses. The joint can therefore be locked in specified swivel positions.

A collapsible chopping spade of this type is relatively bulky. This is because the shaft must have a definite minimum length, which is so great that the shaft is inconvenient when the collapsible chopping spade is being carried or stored. If the shaft of a collapsible spade consists essentially of a light metal tube, to which a Y-shaped handle is hinged, it is possible to fold the handle, which preferably also consists of light metal, against the shaft. This would have the advantage that with a folded spade and handle, the total length is considerably reduced. In addition, a collapsible spade of this type is lighter than collapsible spades which have a wooden shaft. It is however a disadvantage that with work with the chopper or the spade the strain lies on the middle tube.

Known collapsible spades of this type do not lend themselves easily to use as choppers and are therefore not intended for the purposes specified above.

According to the invention, there is provided a collapsible chopping spade comprising a shaft with a tool joint at one end and a handle joint at the other end, the tool joint comprising a tool joint bearing for supporting a joint bolt and a joint part having a respective support edge associated with each of the various positions of a tool fixed thereto for engagement with a movable tool abutment for locking and unlocking the tool joint, the handle joint comprising a part integral with a handle, a handle joint bearing supporting a joint bolt and rigidly connected to the tool joint bearing and a movable handle abutment for engagement with support edges formed on the handle and associated with each of the various positions of the handle, and a stay extending between the handle abutment and the tool abutment for controlling the locking and unlocking movements of both abutments.

Thus the invention provides a collapsible chopping spade with a collapsible handle which can be so adjusted that the tool can serve as a chopper or as a spade.

Because the handle is collapsible, the collapsed length of the chopping spade is comparatively short with the result that it can be more easily carried or stored. Because the handle is lockable in both its collapsed position and its opened position, unintended movement of the handle is avoided. When the handle is collapsed a person carrying it cannot be hindered by undesired swinging of the handle. When the handle is opened, considerable strength can be applied to the tools.

The stay provided between the handle abutment and the tool abutment enables the handle and tools to be locked and unlocked positively and simultaneously, even if both a spade and a chopping blade are present. Handling of the new collapsible chopping spade is thereby simplified and the possibility of mistakes during operation is reduced. For example, it is impossible for the tool to be locked when the handle is free. It is particularly advantageous that during work with the spade or with the chopper the strain is mainly on the shaft holder. If, according to another preferred feature of the invention, the spade blade serves as chopper and accordingly a separate chopping blade is not provided, basically the same advantages emerge.

For simplified operation of the tool, or the tools, and of the handle of the collapsible chopping spade, it is basically possible for both joints to be locked and unlocked with only one operation. For this purpose it is intended, in accordance with a preferred feature of the invention, that the rigid connection of the handle joint bearing and the tool joint is accommodated in the stay which if formed as a tube. One end of this stay forms a stop for one of the two abutments and a nut, of which the front side forms a stop for the other abutment, is located at the other end of the shaft.

Both joints are locked or unlocked by operation of the nut. The convenience of handling of the new spade can also be improved by locating the nut in a place suitable for its operation. For this reason it is intended, according to a further preferred feature of the invention, that the front side of the nut should form the stop for the movable abutment of the handle pivot joint. Then the nut is at the end of the shaft remote from the tool joint, which facilitates its operation.

Transmission of the required force from the handle or shaft to the various tools of the collapsible chopping spade makes it necessary that even with high strains there is no turning of the stay in the tube.

According to a further preferred feature of the invention this is achieved by forming at least a part of the rigid connection with a polygonal cross-section and locating this part in a guide bearing fixed to the tube, another part of the rigid connection having an inner tube which slides in the tube. The bearing then prevents relative rotation of the tube and rigid connection. The handle is formed so that it engages firmly in its respective correct position before it is locked. For this purpose it is desirable to locate a compression spring on the confronting surfaces of the inner tube and of the guide bearing so as to pre-stress the handle pivot joint.

An indexing operation during opening and collapsing of the various tools is also possible with the collapsible chopping spade according to the invention, whether it is a blade usable as both a spade and as a chopper, or whether it is a spade separate from the chopping tool. According to another preferred feature of the invention, the branched tool pivot joint bearing is formed at one end of the inner tube and a compression spring for pre-stressing the tool joint is supported between confronting surfaces of the tool joint abutment and of the part of the rigid connection provided with the inner tube.

Although, in contrast with previously known collapsible chopping spades, a larger number of components must be provided, the weight of the spade can be kept low by using, for example, light metal for those parts for which this is suitable. According to a further preferred feature of the invention, the rigid connection is particularly suitable for formation from light metal. It comprises a tube which has a part with a rectangular cross-section to be guided in the bearing, and a part with a round cross-section, which is fastened to the guide tube.

With the known collapsible chopping spades the support edges associated with the various positions of the tool are formed in recesses in the respective tool joint parts, as mentioned above. This arrangement is disadvantageous because of the danger of contamination of the tool joint. In order to avoid this disadvantage with a collapsible chopping spade according to the invention, it is preferable to form the movable abutment of the tool joint as a plate which is guided by the fork tines of the joint bearing. This plate forms the cross-piece of a member of U-shaped cross-section, of which the ends of both arms form the engagement surface for an annular stop on the end of the tube forming the stay.

The abutment of the handle pivot joint is preferably formed as a flat plate, which has a recess of which the outline corresponds to the polygonal cross-section of the connection tube.

To enable the invention to be better understood two embodiments thereof will now be described, by way of example, with reference to the accompanying drawings, in which:-

Figure 2:
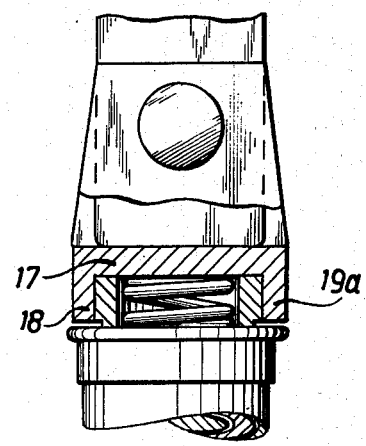

FIG. 1 is a front view, partially in longitudinal cross-section, of a collapsible chopping spade in accordance with the invention, provided with a chopping tool and a separate spade blade, FIG. 2 is a side view of a detail of FIG. 1 from the direction of the arrow X, FIG. 3 is a partial front view of another embodiment of the invention, and FIG. 4 is a side view of the embodiment shown in FIG. 3 with the tool in an alternative position.

FIG. 1 shows a relatively short shaft 1, with a Y-shaped handle 2 pivotally attached at one end and a tool joint 3 at the other. This joint 3 has a forked bearing 4 with fork tines 5 and 6 which serve to support a joint bolt 7, so that the enlarged heads 8 and 9 thereof engage with the outsides of the fork tines 5 and 6. Respective joint parts 10 and 11, which are also forked, are fixed to each of the tools (not shown) of the collapsible chopping spade. The joint part 10 is formed from the forked end of a holder to which a spade blade is attached. The joint part 11 is likewise forked and has two fork tines 12 and 13, which are positioned between the fork tines 10 of the spade blade holder. The joint part 11 is the holder of a chopping tool.

The front faces 14 and 14a of the joint parts 10 and 11, the corresponding rear faces (not visible in the drawing), and the end faces 15 and 16 of the joint parts 10 and 11 form three mutually orthogonal support edges for engagement with a movable abutment 17. The abutment consists of a plate which forms the cross-piece of a member of U-shaped cross-section having arms 18 and 19a. The movable abutment 17 engages with a pressure spring 19. Since the said support edges correspond to respective positions of the tools, a stable position is achieved when one of the support edges rests on the abutment 17. On the other hand, the abutment 17 can move back against the compression spring 19 when the position of one or other of the tools is being altered.

At the opposite end of the shaft 1 to the tool joint 3 there is a handle joint 20 which has a bearing 21 for supporting a joint bolt 22 with enlarged heads 23 and 24. The other joint part is formed from the end portions 25, 26 of the two sides 27 and 28 of the handle 2. The end portions 25 and 26 also have front support edges 29 and 30, rear support edges which are behind the drawing plane and run parallel to the support edges 29 and 30, and end support edges 31 and 32 which are formed on the end faces of the end portions 25 and 26 of the two sides 27 and 28 of the handle 2. A movable abutment in the form of a plate 33 is provided for the handle 2. As a result of this, the handle 2 has a stable collapsed position and a stable opened position which is shown in the drawing.

The bearing 21 of the handle pivot joint 2 and the bearing 4 of the tool joint 3 are connected rigidly together. For this purpose the bearing 21 is attached to a part 34 of the rigid connection. The part 34 has a square cross-section and is mounted in a guide bearing 35 which has a corresponding internal cross-section and is fastened in the inside of a tube 36 which forms the shaft 1.

The said rigid connection also includes a tubular part 37, which is rigidly connected to a guide tube 40 by means of pins 38 and 39. A compression spring 43 is supported between the front surface 41 of the guide tube 40 and the front surface 42 of the bearing 35.

The bearing 4 of the tool joint 3 is formed at the end of the guide tube 40 situated outside the tube 36.

The guide bearing 35 has a male thread 45 extending along part of its length for engagement with the female thread 46 of a nut 47.

On the opposite end of the tube 36 there is a stop 49 on which the front sides 50 of the arms 18 and 19a (described above) of the U-shaped cross-sectioned abutment of the tool joint 3 are supported.

If the nut 47 is so turned that it moves in the direction of the arrow 51, its front end 53 engages with the plate 33 forming the abutment of the handle pivot joint 20. At the same time the front surface of the stop 49 presses on the opposite abutment, so that both joints 20 and 3 are locked.

If the nut is released, the handle 2 can be folded over. During transfer from the front edges 31 and 32 for example on to the neighbouring edges 30 and 29, the guide bearing 35 moves in the opposite direction to the arrow 51 and thereby compresses the compression spring 43.

It is however possible to operate the tool joint in the same way, whereby the spring 19 is compressed and relieved.

The main advantage of the invention is that, in the collapsed position, the chopping spade is a convenient and portable appliance. It can be easily carried on the body, and occupies a small space so that it is particularly suitable for carrying in private cars or for camping.

Adjusting the components as described is relatively easy, with the result that these components can be put quickly into each position as required.

The unitary system for locking the tools and the collapsible handle in position is extensively protected against dirt and corrosion. Free operation of the various joints is thereby obtained even after long periods of use.

The use of round bolts in both joints is particularly advantageous, because bolts of this type can be exchanged relatively easily.

The Y-shape of the handle offers optimum ease of handling of the appliance during work both with the spade blade and also with the chopper.

The embodiment shown in FIGS. 3 and 4 differs from the embodiment shown in FIGS. 1 and 2 only by the fact that instead of a separate chopping tool, to which the joint part 11 with the two fork tines 12 and 13 belongs, only a spade blade 60 is provided. The spade blade 60 has a holder 61 with a rectangular projection 64, which is held between the two fork tines 5 and 6 of the tool joint 3, of which the bearing is again numbered 4 as in FIG. 1.

The same references are used to denote corresponding parts in the two embodiments.

The spade blade 60 has a fully opened position, which is shown in FIG. 3. In this position the tool is in the digging position and is used as a spade. In the half opened position shown in FIG. 4 the spade blade serves as a chopper. For this purpose its front edge has a pointed shape, i.e. the two edges 62 and 63 which converge from the two parallel edges 66 and 67 to form the point. Moreover, the spade blade 60 can of course be moved to a position in which it is folded against the shaft.

A so-called file cutter 69 is provided on one of the parallel edges 66 and 67. This comprises a saw-tooth shaped edge, sharpened by a chamfer 70, which can be used for sawing.

As the enlarged side view detail at Y in FIG. 3 shows, the file cutter 69 consists of several indentations 71 on one side, and a corresponding number of indentations 72 on the opposite side which are offset relative to the indentations 71.

If the nut in the embodiment shown in FIGS. 3 and 4 is released, the spade blade 60 can be swung into the position shown in FIG. 3. If the nut is rotated so that it moves in the direction of the arrow 51 (FIG. 1), its front edge 53 once again engages with the plate forming the abutment of the handle pivot joint 20. At the same time, the front surface of the stop 49 engages with the abutment 17. The spring is thereby made ineffective and the surface 75 (FIG. 4) can no longer be moved away from the abutment 17.

If the spade blade is moved to the chopping position shown in FIG. 4, the abutment 17 engages with the surface 76 adjoining the surface 75, and locks the spade in this position. In the collapsed position, on the other hand, the surface 77 adjoining the surface 76 engages with the abutment 17.

We claim:

1. A collapsible chopping spade comprising a tool, a handle, a shaft, a tool joint at one end of said shaft, a handle joint at the other end of said shaft, the tool joint comprising a tool joint bearing, a joint bolt supported by said tool joint bearing and a joint part supported by said bolt and fixed to said tool, said joint part having a respective support edge associated with each of the various positions of said tool, a movable tool abutment adapted to engage with said support edges for locking and unlocking the tool joint, the handle joint comprising a part integral with said handle, a handle joint bearing rigidly connected to the tool joint bearing, a joint bolt supported by said handle joint bearing a movable handle abutment for engagement with support edges formed on said handle and associated with each of the various positions of the handle, and a stay extending between the handle abutment and the tool abutment for controlling the locking and unlocking movements of both abutments.

2. A collapsible chopping spade according to claim 1, wherein the rigid connection between the handle joint bearing and the tool joint bearing is accommodated in a tube forming the said stay, a stop at one end of the stay forming one of the two abutments and a nut at the other end of the stay having a front side which forms a stop for the other abutment.

3. A collapsible chopping spade according to claim 2, wherein the front side of the nut forms the stop for the movable abutment of the handle pivot joint 4. A collapsible chopping spade according to claim 2, wherein one part of the rigid connection has a polygonal cross-section and is supported in a guide bearing fixed to said tube and another part of the rigid connection has an inner tube which slides in said tube.

5. A collapsible chopping spade according to claim 2, wherein a compression spring engages between confronting surfaces of the inner tube and the guide bearing thereby to pre-stress the handle pivot joint.

6. A collapsible chopping spade according to claim 2, wherein the branched tool joint bearing is positioned at one end of the inner tube and a compression spring for pre-stressing the tool joint is supported between confronting surfaces of the tool joint abutment and of the part of the rigid connection supplied with the inner tube.

7. A collapsible chopping spade according to claim 4, wherein the rigid connection consists of a tube of which the polygonal part is of rectangular cross-section, another part, of round cross-section, being fastened to the inner tube.

8. A collapsible chopping spade according to claim 4, wherein the abutment of the handle pivot joint is a flat plate which has a recess the outline of which corresponds to the polygonal cross-section of the tube.

9. A collapsible chopping spade according to claim 1, wherein the movable abutment of the tool pivot joint is a plate located between the fork tines of the joint bearing, the plate comprising the cross-piece of a member of U-shaped cross-section of which the ends of both arms form the engagement surface for an annular stop on the end of a tube which forms the stay.

10. A collapsible chopping spade according to claim 1, wherein the spade blade serves as a chopper.

11. A collapsible chopping spade according to claim 10, wherein the spade blade is pointed.

12. A collapsible chopping spade according to claim 10, including a file cutter formed on one of the edges of the spade blade.

* * * * *